J. ARDEN.
BROILER FOR GAS STOVES.
APPLICATION FILED OCT. 7, 1910.
1,021,499.
Patented Mar. 26, 1912.
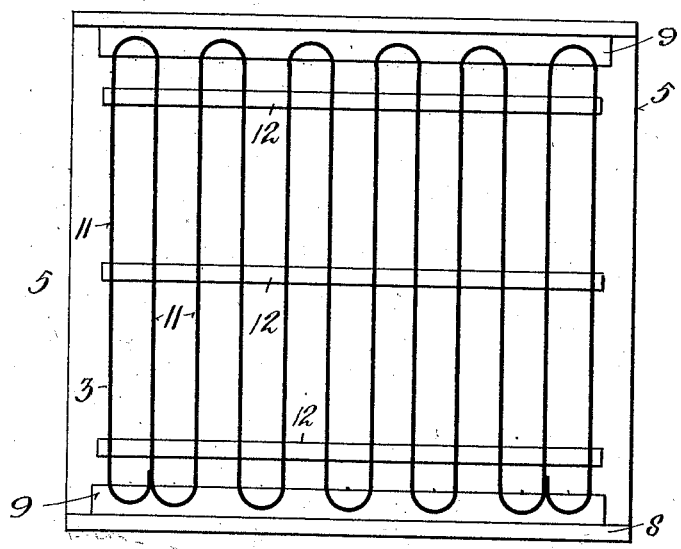
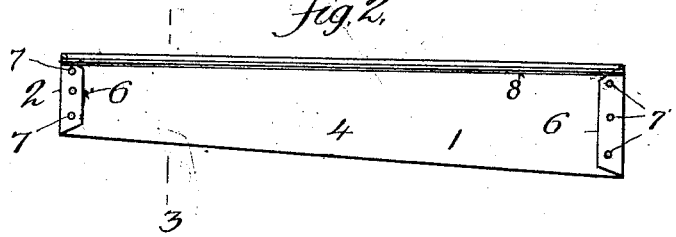
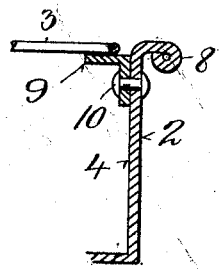

UNITED STATES PATENT OFFICE.

JULIETTE ARDEN, OF NEW YORK, N. Y.

BROILER FOR GAS-STOVES.

1,021,499.

Specification of Letters Patent. Patented Mar. 26, 1912.

Application filed October 7, 1910. Serial No. 585,734.

*To all whom it may concern:*

Be it known that I, JULIETTE ARDEN, a citizen of the United States, and a resident of the city, county, and State of New York, (whose post-office address is 124 West Ninety-fourth street, New York city,) have invented a new and useful Improvement in Broilers for Gas-Stoves, of which the following is a specification.

Heretofore, gas stoves have been provided with a broiler which have been unsatisfactory for the reason that the grease from the meat catches fire and frequently burns the meat.

The object of my invention is to overcome this difficulty by making a broiler which may be inserted in the oven of any gas stove having an oven, and which will, under no circumstances permit the grease to get on fire and burn the meat, and this is true regardless of the temperatures at which the broiler is used, provided that the temperatures are not in excess of those which can be furnished in a gas stove under the conditions of service.

The embodiment of my invention hereinafter set forth accomplishes this object so that when my improved broiler is used, it may be disregarded in so far as all danger of burning the grease is concerned.

For a more particular description of my invention, reference is to be had to the accompanying drawings forming a part in which:

Figure 1 is a plan view of my improved broiler. Fig. 2 is a side elevation of the same. Fig. 3 is an enlarged sectional view taken on the line 3—3 of Fig. 2, looking in the direction of the arrows. Throughout the various views of the drawings, similar reference characters designate similar parts.

1 is my improved broiler which is preferably made substantially as shown. This broiler is composed of a pan 2 and a gridiron 3.

The pan 2 is preferably made of sheet iron of the proper thickness and has its sides 4 and ends 5. The ends 5 have flaps 6 which are secured by rivets 7 to the sides 4 in the conventional manner, or these sides and ends may be united in any other desired way. The process of uniting is immaterial provided the structure is so organized and arranged that a tight pan is made. It is essential however, that the front end 5 be deeper than the rear end 5 so that the bottom of the pan is inclined when the pan is in position. In the embodiment of my invention herein shown, the pan shown is substantially 16 inches square with the front four inches deep and the rear three inches deep.

The pan must be substantially two or more inches deep below the grid. The grid is suspended in a plane at or near the top of the pan, at a distance of about two or more inches from the bottom of the pan. It is suspended, as will appear below, by projections from the side walls of the pan, in such a way that feet are unnecessary.

The upper edges of the sides 4 are bent and curled over as shown at 8 so as to form a flange which may be supported by suitable ribs on the interior of the stove. On the interior of the pan and extending parallel to the flange 8, but not the entire length of the interior, are suitable angle metal supports 9 which are secured by rivets 10, as shown. The angle metal supports 9 carry the gridiron 3. These angle metal supports do not extend throughout the entire length of the interior so that there will be room to pour the melted grease from the broiler at any corner as it accumulates. These angle metal supports 9 are made narrow so as to catch as little fat as possible, and under no circumstances can fat flow from them to the bottom of the pan in such a way as to carry fire along with the grease, as would be the case if there were feet that ran directly from these flanges or from the grid in such a way that grease would find a ready channel down which to pass to the bottom of the pan. It is obvious that when grease does pass to the bottom of the pan in a small stream on a substance such as metal, fire will readily follow the grease.

The gridiron 3 is preferably formed of a rod bent at the sides as shown in Fig. 1 so as to pass back and forth with parallel parts 11 which are united by suitable bands 12 in the conventional manner. Preferably three bands are employed, one in the middle and one near each edge. The ends are bent in the reverse direction. As the gridiron is practically in one plane, it has no projecting feet and has no projections of any sort which run down to the bottom of the pan or toward the bottom of the pan upon which grease may run and carry fire to the bottom of the pan. The grid, as above set forth, is supported by a flange at each side and this does away with the feet and with the troubles that flow therefrom.

My improved broiler is used as follows: It is first placed in the stove, the flanges 8 resting on suitable guides on the interior of the oven of the stove. The broiler is then slid in place and then when in position, the gas is turned on and lighted and the broiler is heated, for say twenty minutes. When once heated, the meat to be broiled is put on the gridiron 3 and as it is heated, the fat and gravy are forced from the meat and fall on the inclined bottom of the broiler. It falls too far from the flame to be ignited and it then runs down to the front of the pan, the coolest place, where it accumulates but does not accumulate sufficiently to get high enough to be ignited. When the meat is sufficiently done on one side it is turned over and broiled on the other side and when it is sufficiently broiled it is removed from the gridiron and then the broiler is removed and the juices or fat or gravy in the bottom is poured out, leaving the broiler in condition for further use as above described.

I am aware that broilers are shown in prior patents such as the patent to J. H. Laird, 677,035, dated June 25, 1901, and the patent to B. McCaughey, 744,785, dated November 24, 1903. In each of these two patents is shown a pan in which the grid is supported on legs or other means, which would carry the grease in such a way as to insure ignition when the device is in use. In the Laird patent the grid rests directly on the top of the supplemental plate which is carried by legs and has a deflecting shelf which drains the grease in close proximity to the meat, so that if sufficient heat is used to broil the meat, the grease will be ignited as it runs down the shelf 5 to the bottom of the pan and carry the fire with it, whereby a destructive conflagration will result and an explosion often follows.

While I have shown and described one embodiment of my invention, it is obvious that it is not restricted thereto, but is broad enough to cover all structures that come within the scope of the annexed claim.

What I claim is—

A broiler, comprising in combination, a pan and a gridiron, the latter having a substantially plane under surface devoid of such downward projections as would be likely to cause grease running down them to ignite the juices in the pan, the gridiron being supported by the walls of the pan at or near the top thereof, and the minimum distance from the under surface of the gridiron to the bottom of the pan being not less than two inches.

JULIETTE ARDEN.

Witnesses:
 HAMILTON R. SQUIER,
 O. ELLERY EDWARDS, Jr.